Jan. 29, 1952 K. A. BOWEN Re. 23,458

ROBO-CHORD

Original Filed Oct. 26, 1948 2 SHEETS—SHEET 1

K. A. Bowen
INVENTOR

BY C. A. Crowe & Co.
ATTORNEYS.

ROBO-CHORD

Original Filed Oct. 26 1948 2 SHEETS--SHEET 2

K. A. Bowen
INVENTOR

BY C. A. Snow & Co.
ATTORNEYS.

Reissued Jan. 29, 1952 Re. 23,458

UNITED STATES PATENT OFFICE 23,458

ROBO-CHORD

Kermit A. Bowen, La Mesa, Calif.

Original No. 2,521,686, dated September 12, 1950, Serial No. 56,505, October 26, 1948. Application for reissue September 10, 1951, Serial No. 245,831

12 Claims. (Cl. 84—320)

Matter enclosed in heavy brackets [ ] appears in the original patent but forms no part of this reissue specification; matter printed in italics indicates the additions made by reissue.

This invention relates to musical instruments, and more particularly, has reference to a stringed instrument most closely resembling a zither.

An important object of the invention is to provide an instrument that will be a musical education in itself, executing chord progression, and will vividly portray the intervals, which make one chord differ from another.

Another important object of the invention is to provide a device or instrument as described so designed as to enable anyone not familiar with music to make all the chords in all the keys in rapid succession.

Another important object of the invention is to provide a device of the character described which will be an aid to the music students, in learning the chords.

Another important object is to provide a musical instrument of the character described which can be played with one hand, so that the melody may be played with the other hand, or so that said free hand may be used to follow words or other indicia.

In its broader aspects, the invention includes a sound box in which are secured a plurality of strings, so that the instrument has the general appearance of a zither; a trackway extending over the strings; a frame slidable in the trackway, so that it can be adjusted to different positions relative to the strings for the purpose of playing chords in different keys; a plurality of bars [removably] mounted on the frame, these bars being removable [so] *if it is desired* that other bars may be substituted, and each bar having spaced depressions located over the particular strings to be picked; and a pick specially formed to ride from end to end of a selected bar, and responsive to the depressions in the bar for the purpose of picking all the strings of a particular chord.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings.

Figure 1:
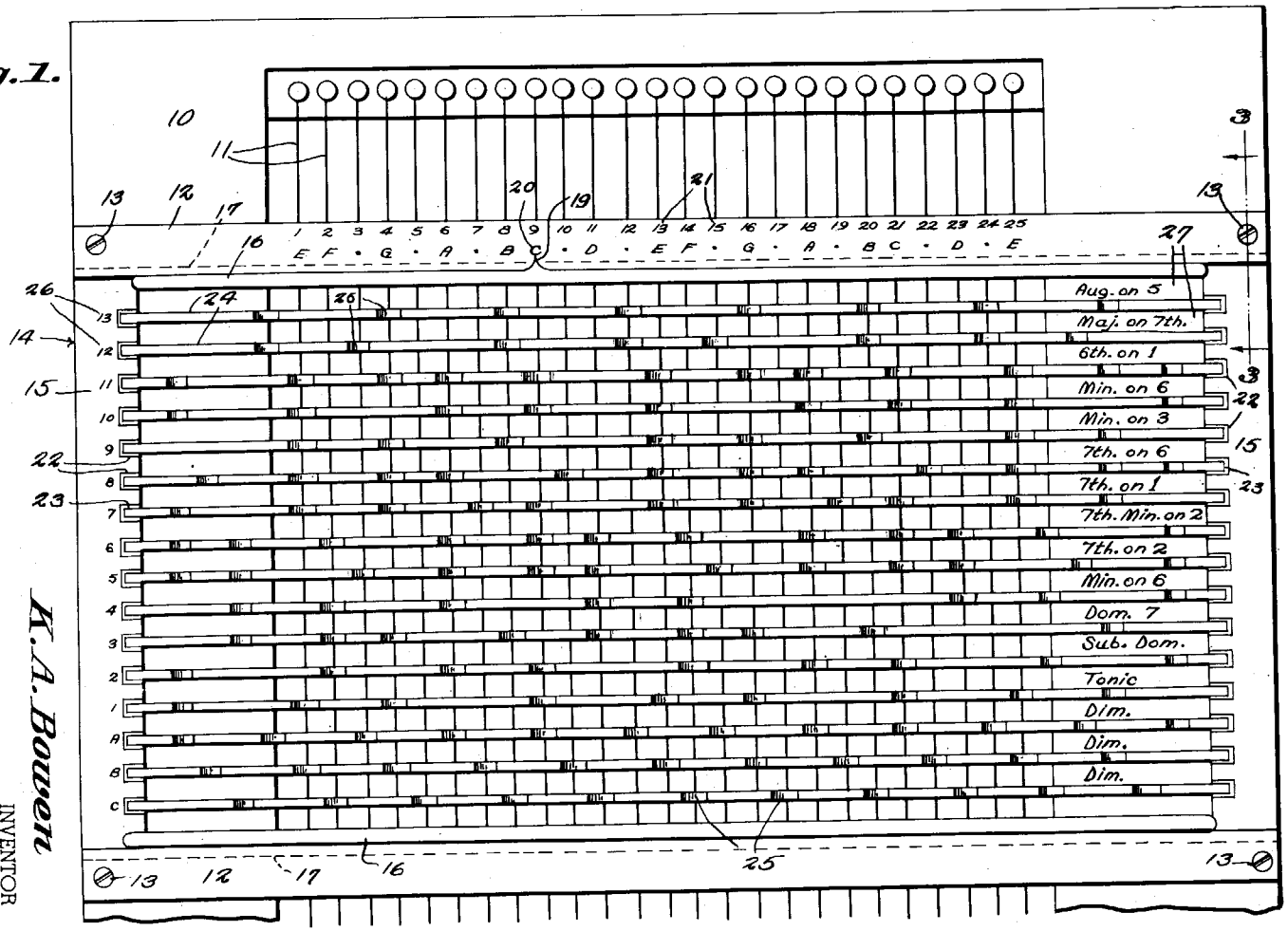
Figure 1 is a top plan view of an instrument constructed in accordance with the invention, one end thereof being broken away.

Referring to the drawings in detail, 10 is a sound box the design of which may obviously be varied, said sound box having secured therein the strings 11. In the illustrated example, the strings cover two octaves, and they are tuned chromatically. It will be understood that more or less strings can be used as desired.

Cross members 12 are mounted on the side walls of the sound box 10, being secured fixedly by fastening means 13. These cross members are parallel, and provide a trackway for the rectangular frame generally designated 14, said frame comprising the end members 15 and the side members 16, all fixedly joined to provide the frame.

Figure 3:
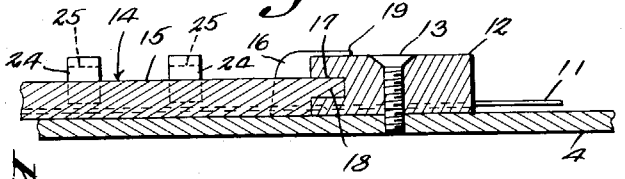
Figure 3 is an enlarged section substantially on line 3—3 of Fig. 1 showing the slidable mounting of the frame.

To mount the frame slidably in the trackway, I form in the cross members 12 the grooves 17 (Figs. 1 and 3) that extend from end to end of each cross member. Received in the grooves are the tongues 18 projecting from members 16 and the respective end members 15 of the frame, and thus the frame is slidably mounted in the trackway.

The purpose of slidably mounting the frame in the trackway is to permit the frame to be adjusted to various positions relative to the strings 11, so that the chords can be played in any selected key. Once adjusted to a selected position, the frame is left stationary during the use of the device, until such time as it may be desired to change the key.

To designate the key in which the chords will be played, I form on one of the members 16 the index 19, that overlies one of the cross members 12, said cross member 12 being marked with suitable indicia 20 to designate the various keys.

The same cross member 12 is also preferably marked with indicia 21 to number the strings, although said numbering of the strings is not of course critical to the invention.

Formed in the opposed end members 15 are the notches or seats 22, felt padded as at 23, and in the seats 22 are received the ends of the elongated bars 24. In the present instance, the device is illustrated as having sixteen of these bars, but more or less of them can be used as desired. In any event, each bar has formed at selected spaced intervals the depressions 25, each depression or concavity 25 overlying a particular string 11. *The bars 24 are evenly spaced apart and they extend over the many strings on the sound box in spaced and transverse relation to the strings; thus forming along one side of each bar, between it and an adjacent bar or longitudinal member of the bar frame or bridge, a corresponding channel or slot to receive and guide a pick across the set of strings in the playing of a chord or of selected notes in a chord. The intervals of the spaced grooves or depressions of each bar are arranged to correspond with the spacings of the strings to be picked in sounding a particular chord, and the bar frame is provided with as many different pick channels and differently grooved guide bars as may be needed for playing the different chords to be rendered in the use of the instrument. Any desired chord or sequence of harmonious notes or chords then may be played simply by moving a suitable pick into and along the appropriate channel, or along selected channels in succession, while holding the pick by hand in operative engagement with the corresponding guide bar or bars as hereinafter indicated. Each stroke of the pick thus is guided evenly across the strings, and in each stroke the formations on the corresponding guide bar hold the pick out of contact with strings discordant to the desired chord or melody yet lower the pick into proper playing contact with strings belonging to that chord.*

The particular bars *or the corresponding channels* may be designated by number as shown at 26, the numerical marking of the bars being provided on one end member 15. Or, and as shown at 27, tabs or cards can be used in association with *the channel corresponding to* each bar to designate the chord which is played by the use of that particular bar.

The bars 24 can of course be substituted, and thus any composition can be played without leaving out or substituting chords, it being necessary only that the player first substitute for those bars already on the device other "spare" bars from a reserve rack, so that a particular composition can be played. Some of the bars, representing the main chords, can be fixed in position, rather than capable of substitution, so as to make the whole frame construction more rigid.

Figure 5:
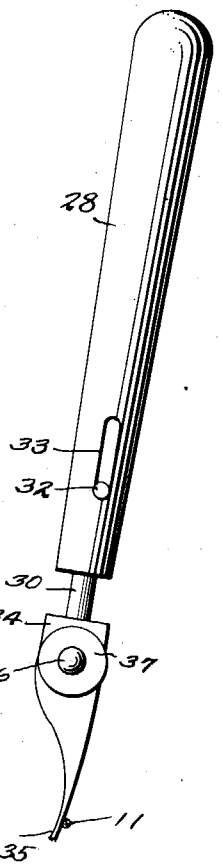
Figure 5 is a side elevational view of said pick.
Figure 4:
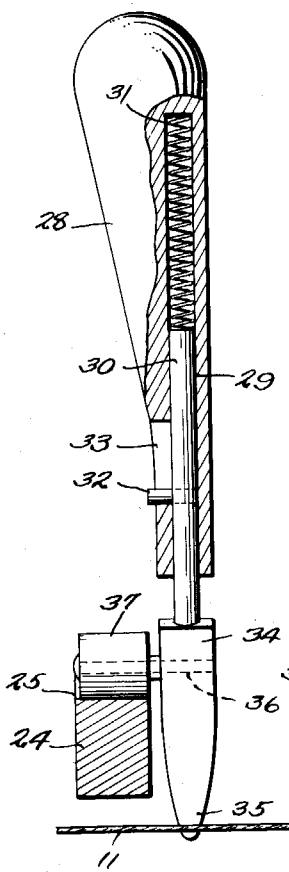
Figure 4 is a view partly in front elevation and partly in longitudinal section through a pick as it appears when traversing one of the bars.
Figure 2:
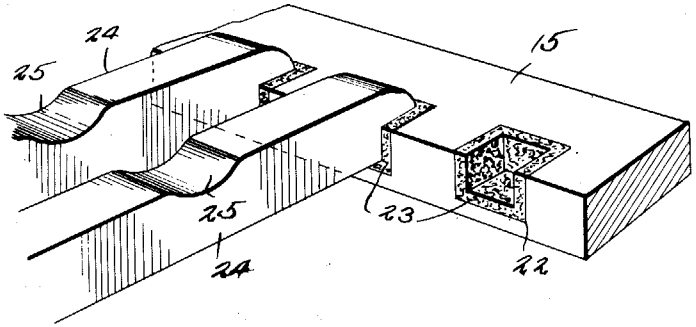
Figure 2 is an enlarged fragmentary perspective view showing the removable mounting of the bars.

In use of the device a pick illustrated in Figs. 4 and 5 is employed. This has a handle 28, formed with the bore 29 in which is adapted to reciprocate the plunger 30, that is spring pressed outwardly by spring 31 held under compression within the bore. Movement of the plunger in opposite directions is limited by provision of lug 32 on the plunger that rides in slots 33 of the handle.

One end of the plunger projects from the handle, and has secured to it the pick member 34, that tapers to a thin resilient end 35 adapted to pick a string 11.

Extended laterally from the pick member 34 is the cross pin 36, on the projecting end of which is rotatably mounted the rubber roller 37 that is adapted to ride upon a bar 24.

The use of the device will now be readily understood. Assuming that the player intends to play the chords to a particular composition, he makes such substitution of bars 24 as may be necessary to represent all the chords of said composition. Then, following instructions written elsewhere as to which chords are to be played, the player starts at the left hand end of a selected bar 24, and with the roller 37 riding on the top of the bar, moves the pick *within and along the channel at one side of that bar, continuing* to the right hand end of the bar *if all the notes in the chord of that bar are to be sounded.* By doing so, roller 37 is caused to enter in succession all the depressions 25 of that particular bar. This causes the end 35 of the pick to be depressed each time the roller moves into a depression, whereupon the string 11 under that depression is picked. *It will be evident that any desired note or succession of notes among those of a particular chord may be played in any stroke of the pick merely by choosing the starting point or the stopping point for the stroke, or both. Further, by starting each stroke with bass notes of a chord and stopping it after sounding a desired treble note thereof, and executing successive strokes in this manner with suitable timing and with proper selection of the terminal treble notes sounded in the successive strokes, the melodies as well as the chords of complete musical compositions can be played in a very simple manner.*

It is understood that before using the instrument at all for the purpose of playing a particular composition, the player may first desire to slidably adjust the frame in its trackway so as to provide for the playing of the chords in a selected key.

What is claimed is:

1. In a stringed instrument the combination, with a set of strings, of a plurality of *spaced* parallel bars extended thereacross, each bar representing a chord and having a depression disposed over each string to be played in sounding said chord, *spaces between said bars forming channelways to guide a pick over the strings,* and pick means adapted *to be moved in and along any selected channelway and thereby* to traverse a bar and to move into the depressions of a bar for lowering into engagement with the strings underlying the [depression.] *respective depressions.*

2. A stringed instrument as in claim 1, and said pick means including a roller adapted to ride over a bar and through the depressions of the bar.

3. In a stringed instrument the combination, with a sound box and a set of strings [therein] *thereon,* of a frame supported by the sound box over the strings, means for adjusting the frame relative to the strings to provide for key selection, a plurality of bars supported on the frame *in evenly spaced relation and transverse to the strings, spaces between said bars forming channelways to guide a pick over the strings,* each bar having spaced depressions overlying selected strings, and pick means adapted [for rollable traversing of a selected] *to be moved in and along any selected channelway and including a pick positioner thereupon resting on and traversing a corresponding* bar, said pick means *having a pick* adapted by movement *of said pick positioner* into and out of the depressions of a bar, to be lowered into engagement with the strings underlying the [depression.] *depressions.*

4. In a stringed instrument the combination, with a sound box and a set of strings [therein] *thereon,* of a trackway mounted on the sound box and [extending] *directed* across the strings, a frame slidably mounted in the trackway, a [plurality of] *multiplicity of spaced* bars [removably] supported by the frame, *spaces between said bars forming channelways to guide*

*a pick over the strings,* each bar having spaced depressions overlying selected strings, and pick means adapted *to be moved in and along any selected channelway and having a pick positioning element thereupon operative* to traverse [selected bars] *a corresponding bar* and to move into and out of the depressions of the bar, for engaging *a pick with* selected strings.

5. In a stringed instrument the combination, with a set of strings, of [bars extending] *a multiplicity of spaced bars adapted to extend* thereacross, *spaces between said bars forming channelways to guide a pick over the strings,* each bar representing a chord and having depressions spaced longitudinally thereof, said depressions adapted for lowering of a pick moved along [said means] *any selected channelway while contacting a corresponding bar* into engagement with selected strings to be sounded, and for elevation of the pick above strings not to be sounded.

6. In a stringed instrument the combination, with a sound box and a set of strings therein, of a frame supported upon the box and extending over the strings, a plurality of chord bars carried by the frame, each of which has spaced depressions in its upper surface overlying selected strings, and a pick adapted to be moved along the upper surface of a chord bar and to move into and out of the depressions for picking said selected strings.

7. In a stringed instrument the combination, with a sound box and a set of strings therein, of a pair of parallel cross members fixedly mounted upon the box and extended transversely of the strings, an approximately rectangular frame slidably mounted upon the cross members for adjustment transversely of the strings, chord bars removably supported by the frame, each chord bar having spaced depressions in its upper surface, and a roller-mounted pick adapted to roll along the upper surface of a chord bar and to be lowered into engagement with selected strings by movement into and out of the spaced depressions.

8. In a stringed instrument the combination, with a sound box and a set of strings therein, of a pair of parallel cross members fixedly mounted upon the box and extended transversely of the strings, an approximately rectangular frame supported by the cross members for bodily adjustment transversely of the strings to selected positions, there being spaced seats formed in the ends of said frame, chord bars having their ends removably supported in the seats, each chord bar having spaced depressions in its upper surface, and a roller-mounted pick adapted to roll along the upper surface of a chord bar and to move into and out of the depressions, for lowering of the pick into engagement with strings underlying the depressions.

*9. In a stringed instrument, a sound box carrying a set of tuned strings corresponding to at least one full octave, supporting means on said box spaced apart lengthwise of the strings and projecting above them to hold in playing position over the strings a pick-guiding frame having a multiplicity of spaced parallel chord bars extending across the strings, and a scale fixed in transverse relation to the strings and carrying indicia denoting key notes of the respective strings, said supporting means providing a track*

*in which the frame is slidable over the strings to a playing position for any desired key of the scale.*

*10. For a stringed instrument comprising a multiplicity of tuned strings adapted to be played by a pick, a pick-guiding frame comprising a multiplicity of evenly spaced bars adapted to extend across the strings of the instrument, spaces between the bars constituting separate channelways to receive and guide the pick across the strings in playing the instrument, a bar for each channelway comprising means operative upon the pick as it is moved therealong to lower the pick at predetermined intervals into positions for engagement with the strings to be picked in playing a particular chord, and to hold the pick over the strings between those intervals.*

*11. For a stringed instrument including a multiplicity of tuned strings adapted to be played by a pick and a pick-guiding frame having a multiplicity of evenly spaced chord bars extending across the strings with a pick channelway along each bar and pick-actuating means at selected intervals therealong, a pick member comprising a pickstock adapted to be moved by hand along any selected channelway, a pick assembly carried reciprocably by said pickstock including a pick projecting therefrom so as to move within the channelway for engagement with strings thereunder, and pick positioning means on said assembly for cooperation with said pick-actuating means so as to move the pick into and out of such engagement as it traverses the channelway.*

*12. For a stringed instrument including a multiplicity of tuned strings adapted to be played by a pick and a pick-guiding frame having a multiplicity of evenly spaced chord bars extending across the strings with a pick channelway along each bar and depressions at selected intervals therealong, a pick member comprising a pickstock adapted to be moved by hand along any selected channelway, a pick assembly carried reciprocably by said pickstock including a carrier reciprocable in a bore of the pickstock and a pick projecting therefrom so as to move within the channelway for engagement with strings thereunder, cooperative means on the carrier and pickstock limiting the outward and inward positions of said assembly, spring means normally holding the same in outward position, and pick positioning means on said assembly including a roller projecting to a side thereof so as to bear against a chord bar and move into and out of its depressions as the pick member is moved in and along the corresponding channelway.*

KERMIT A. BOWEN.

REFERENCES CITED

The following references are of record in the file of this patent or the original patent:

UNITED STATES PATENTS

| Number | Name | Date |
|---|---|---|
| 480,750 | Stark et al. | Aug. 16, 1892 |
| 608,897 | Muller | Aug. 30, 1898 |
| 1,097,048 | Reynolds et al. | May 19, 1914 |
| 2,401,571 | Konter | June 4, 1946 |

FOREIGN PATENTS

| Number | Country | Date |
|---|---|---|
| 11,529 of 1896 | Great Britain | June 27, 1896 |